United States Patent [19]

Laude

[11] Patent Number: 4,544,232
[45] Date of Patent: Oct. 1, 1985

[54] COUPLING-EXTRACTING DEVICE FOR OPTICAL SIGNAL

[75] Inventor: Jean-Pierre Laude, Saclas, France

[73] Assignee: Instruments S.A., France

[21] Appl. No.: 372,716

[22] Filed: Apr. 28, 1982

[30] Foreign Application Priority Data

Apr. 30, 1981 [FR] France ............... 81 08636

[51] Int. Cl.⁴ .......... G02B 5/14; G02B 5/10; G02B 5/18
[52] U.S. Cl. ............... 350/96.15; 350/96.18; 350/162.23; 350/612
[58] Field of Search ............ 350/96.15, 96.18, 96.19, 350/96.20, 299, 162.23

[56] References Cited

U.S. PATENT DOCUMENTS

| | | | |
|---|---|---|---|
| 2,911,177 | 11/1959 | West | 350/299 |
| 3,267,806 | 8/1966 | Azegami | 350/299 |
| 4,094,578 | 6/1978 | DiVita et al. | 350/96.15 |
| 4,257,673 | 3/1981 | Matthijsse | 350/96.19 |
| 4,280,751 | 7/1981 | DiVita | 350/96.15 |
| 4,329,017 | 5/1982 | Kapany et al. | 350/96.15 |
| 4,381,137 | 4/1983 | Berg et al. | 350/96.18 |
| 4,479,697 | 10/1984 | Kapany et al. | 350/96.18 |
| 4,484,793 | 11/1984 | Laude | 350/96.20 |

FOREIGN PATENT DOCUMENTS

| | | | |
|---|---|---|---|
| 2441869 | 6/1980 | France | |
| 33129 | 3/1980 | Japan | 350/96.15 |
| 60906 | 5/1980 | Japan | 350/96.15 |

*Primary Examiner*—William L. Sikes
*Assistant Examiner*—Frank González
*Attorney, Agent, or Firm*—Handal & Morofsky

[57] ABSTRACT

Coupling-extracting device for an optical signal between an upstream fibre and a downstream fibre, with continuity of the signal from upstream to downstream and at the same time extraction of part of the signal to a detector and re-injection from an emitter.

It comprises an entirely reflecting system placed only in the central part of the beam between the upstream fibre and downstream fibre. The same system is used to divert towards the downstream fibre the light coming from the emitter and to prevent the direct passage of light from the emitter to the detector.

15 Claims, 4 Drawing Figures

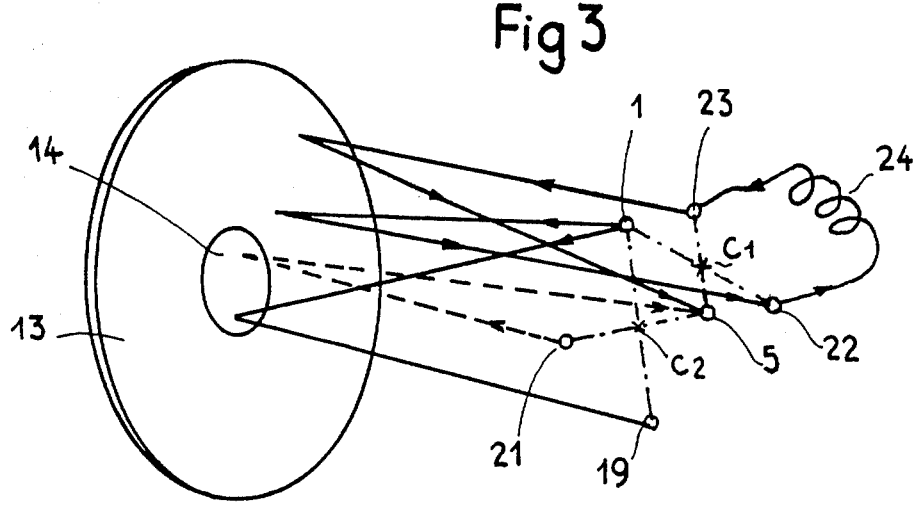
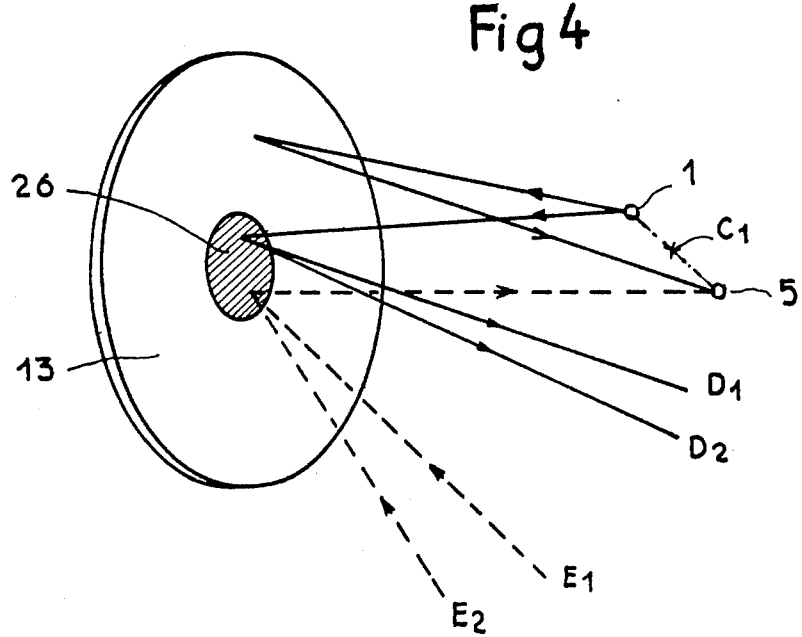

COUPLING-EXTRACTING DEVICE FOR OPTICAL SIGNAL

BACKGROUND OF THE INVENTION

The present invention relates to a coupling-extracting device for a signal transmitted by optical fibres. It is more particularly intended to be inserted in a transmission optical fibre so as to make it possible to extract, whilst maintaining the continuity of transmission of the initial signal through the device from upstream to downstream, part of the signal to a detector, and at the same time to re-introduce a new signal in a downstream direction; moreover, it is possible for this new signal to be either the same extracted signal, after regeneration, or another signal, carrying new information.

PRIOR ART

The known devices currently used for this purpose generally comprise, between the upstream transmission fibre and the downstream transmission fibre, an optical system intended to make parallel the rays of light coming from the upstream fibre, and an optical system which focuses the parallel beam on the inlet of the downstream fibre again. In the portion where the rays are parallel, the device comprises a semi-reflecting system which branches off a controlled fraction of the light to a detector or any other receptor system.

Such a device has the disadvantage, when the re-introduction of a new signal is intended, that the semi-reflecting surface lets through part of the light re-introduced, which light then travels directly towards the detector and falsifies the information collected therein. Moreover, sampling on the whole of the beam results in sampling a signal which may lack homogeneity; in fact, there exists a certain time shift between the rays corresponding to different modes of propagation in the fibre. The rays close to the axis at the outlet of the fibre tend to be in advance of those issuing at larger angles.

There is also known, for example from the French Patent Application published under No. 2,441,869, a means of ensuring the continuity of transmission of a signal between an upstream fibre and a downstream fibre, arranged symmetrically relative to the centre of a concave spherical mirror; the whole of the light coming from the end of the upstream fibre is then directed by reflection onto the inlet of the downstream fibre, where it continues to propagate. However, such a device does not make it possible to extract part of the signal, nor to superpose a new signal thereon.

SUMMARY OF THE INVENTION

The present invention thus concerns a coupling-extracting device for an optical signal, between an upstream input transmission fibre and a downstream output transmission fibre, intended both to ensure the continuity of the transmission between the upstream and downstream fibres and to extract part of the signal to a detector, and/or to couple to the downstream fibre a new signal originating from an emitter.

According to the invention, the device comprises an entirely reflecting system arranged in the optical path between the upstream fibre and the downstream fibre, and only in the central part of the light beam, between these two fibres, so as to divert to the detector only part of the light coming from the upstream fibre and corresponding to the rays having the lowest mode of propagation, the same entirely relatively reflecting system also being used to send the light, originating from the emitter, towards the downstream fibre.

According to a preferred embodiment of the invention, a device is used which consists of a concave spherical mirror, having a vertex S and a centre $C_1$, and the ends of the upstream and downstream transmission fibres are arranged in the plane perpendicular to the axis $SC_1$ in $C_1$, and symmetrically relative to $C_1$; according to the invention, the central part of this first mirror is replaced by a second spherical mirror, having the same vertex and the same radius, but the centre of which, $C_2$, is slightly displaced relative to $C_1$, and the extracted signal and/or the new coupled signal are then extracted and/or coupled in directions symmetrical, respectively, to the direction joining S to the centre of the end of the upstream transmission fibre and to the direction joining S to the centre of the end of the downstream transmission fibre, relative to the axis $SC_2$.

According to another embodiment of the invention, the central part of the concave mirror consists of a concave diffraction grating, the spherical support of which has the same vertex and the same centre as the mirror, and the extracted or coupled signals are extracted or coupled in diffraction directions corresponding to their respective wavelengths.

BRIEF DESCRIPTION OF THE DRAWINGS

The invention will be better understood by referring to particular embodiments given by way of example and illustrated in the attached drawings.

FIG. 3 is an alternative embodiment of the device according to FIG. 2, making it possible to introduce a lag on the light directly transmitted from the upstream fibre to the downstream fibre.

FIG. 4 is another alternative embodiment in which a diffraction grating is used.

DETAILED DESCRIPTION

Figure 1:
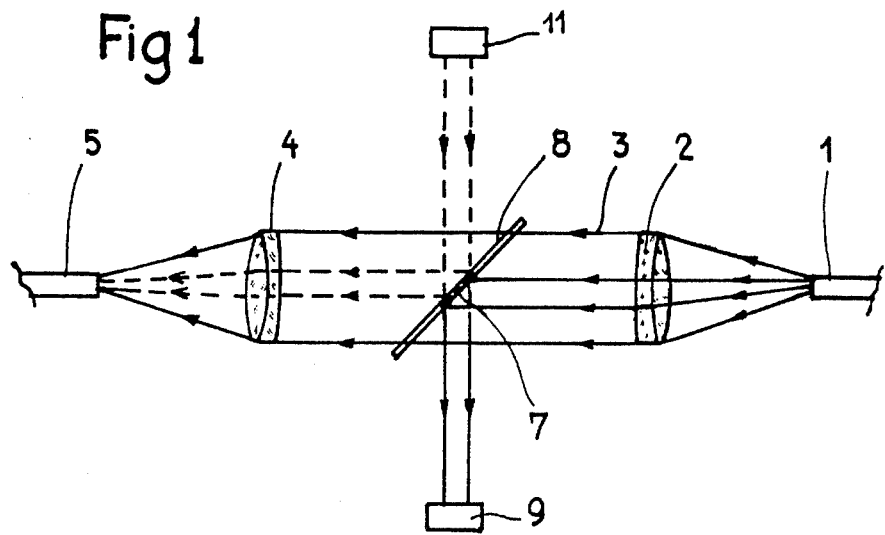
FIG. 1 is a simplified optical diagram of a first embodiment of the invention, of the type using a mirror with two reflecting parallel faces.

Referring firstly to FIG. 1, a known general arrangement for a coupling-extracting device is shown. The light conveyed by the upstream transmission fibre 1 is emitted at the end of this fibre and trapped by an optical system 2 which makes the beam 3 parallel. The beam 3 is then again focused by the optical system 4 to be concentrated on the end of the downstream transmission fibre 5. But here, in contrast to the usual method of sampling part of the beam, the sampling is made only in the central part of the parallel beam 3, by means of a small, totally reflecting mirror 7, consisting of a reflecting layer formed at the centre of a totally transparent optical flat 8. The beam sampled by the mirror 7 is diverted to a detector 9. As the reflection layer 7 is treated on both its faces, it will also be possible to re-inject light, from a source 11, by directing its beam onto the mirror 7 which will divert it to the system 4 and the fibre 5. In the case where the source 11 is a laser, with a narrow outlet area, the whole of the light will be diverted, without loss, by the mirror 7, and, in any case, no re-injection light will be diverted to the receptor 9, projected from this spurious transmission by the mirror 7. The sampling of the signal in the central part of the beam 3 also has the advantage of sampling the rays of lower mode of transmission in the fibre, which are therefore slightly in advance, which will minimise the phase shifts when the signal has to be re-injected after regeneration, which inevitably results in lags.

Figure 2:
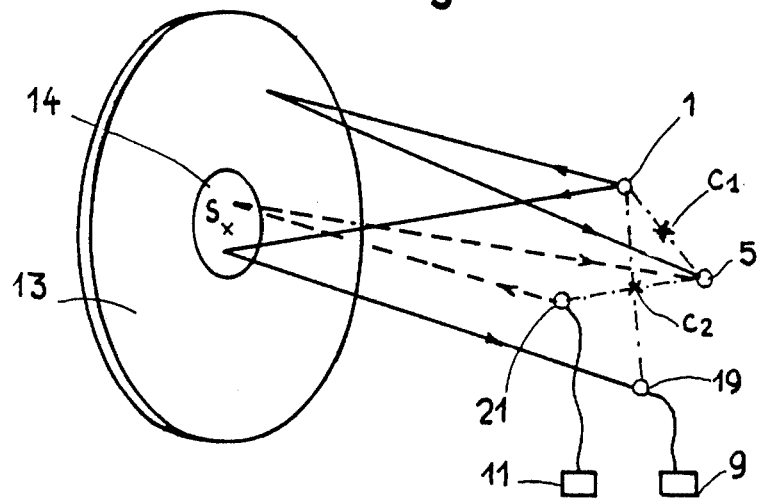
FIG. 2 is an optical diagram of a second embodiment of the invention, of the type using a concave spherical mirror for the transmission from the upstream fibre to the downstream fibre.

FIG. 2 will now be considered. It illustrates diagrammatically a preferred embodiment in which the direct transmission from an upstream fibre to a downstream fibre is carried out, in a known manner, by means of a concave spherical mirror 13 of vertex S and of centre $C_1$. The ends 1 and 5 of the respectively upstream and downstream transmission fibres are here arranged symmetrically in the vicinity of and on either side of the centre $C_1$, and in the plane perpendicular to the axis $SC_1$. In this way, all the light emitted at the end 1 of the upstream fibre is reflected towards the end 5 of the downstream fibre. But here the central part of the mirror 13 is replaced by another concave spherical mirror 14, having the same vertex S and the same radius as the mirror 13, but the centre $C_2$ of which is displaced relative to the centre $C_1$ of the mirror 13. In these conditions, it can be understood that the rays coming from the upstream fibre and falling on the mirror 14 will be reflected and focused in a symmetrical point of the end 1 of the upstream fibre relative to $C_2$. Then, if the end of a fibre connected to the detector 9 is placed on this point 19, the requisite sampling will be made of the central rays of the beam emitted by the upstream fibre 1, which rays correspond to the rays of lower mode of transmission. In the same manner, if the end 21 of an optical fibre connected to the source 11 of a new signal is placed symmetrically relative to the centre $C_2$ of the end 5 of the downstream fibre, it can be understood that the light emitted at 21 will be reflected by the mirror 14 onto the downstream fibre 5, to be transmitted at the same time as the light coming from the upstream fibre 1 and reflected by the mirror 13.

If the light cone emitted by the fibre 21 is such that part of this light falls on the mirror 13, this light will be lost but will not be in danger of disturbing the light collected by the fibre 19.

It has been seen that the signal sampled in the device could be re-injected downstream, after regeneration, and that the regeneration circuits could introduce a lag of the re-injected signal relative to the initial signal. It is possible to re-phase the two signals by slightly delaying the light transmitted from the upstream fibre to the downstream fibre, by forcing it to travel a further path in an intermediate fibre. This can be done, as shown in FIG. 3, by placing the ends 22 and 23 of the intermediate fibre 24 in positions respectively symmetrical, relative to $C_1$, to the end 1 of the upstream fibre and the end 5 of the downstream fibre. Thus, the light proceeding from 1 is focused by the mirror 13 on the end 22 of the intermediate fibre 24, from which it comes out at 23 to be reflected again by the mirror 13 and focused on the inlet 5 of the downstream fibre. Meanwhile the fraction of light emitted by the upstream fibre 1 and reflected by the central mirror 14 to the detector 19, then re-emitted, after regeneration, by the end of the fibre 21, is reflected again by the mirror 14 and focused on the inlet 5 of the downstream fibre where it recombines with the light coming from the intermediate fibre 24.

According to another embodiment illustrated diagrammatically in FIG. 4, the central part of the mirror 13 can also consist of a concave diffraction grating 26, designed on the same support as the surface of the mirror. The upstream and downstream fibres 1 and 5 are again arranged symmetrically relative to the centre $C_1$, of the mirror 13, so that all the light emitted at 1 and reflected by the mirror 13 is focused in 5. On the other hand, the fraction of light emitted at 1 but falling on the grating 26 is diffracted in as many directions as wavelengths and it will thus be possible to detect several separated signals by means of detectors such as $D_1$ and $D_2$. In the same manner, if emitters such as $E_1$ and $E_2$ are placed in suitable positions as a function of their light wavelengths, it will be possible to multi-combine on the downstream fibre 5 different wavelengths proceeding from angularly separated sources.

The invention is obviously not strictly limited to the embodiments which have been described by way of examples, but also embraces embodiments which would differ therefrom only in details, by alternative forms of execution, or by the use of equivalent means. Thus, FIGS. 2 and 3 show that ends of optical fibres are used to collect the extracted signals or to introduce the new signals to be re-injected, but it would also be possible to use these detectors or emitters directly, without passing through an optical fibre; it would then suffice to arrange these detectors or emitters in those directions defined by the directions which are symmetrical, relative to the axis $SC_2$, with the directions joining S to the centre of the end of the upstream and downstream transmission fibres.

It would equally be possible to render the device monoblock by filling the space existing between the fibres and the mirrors with an optically transparent substance, such as, for example, plastic or glass.

It will also be possible to use optical fibres or different characteristics according to their role in the device. Thus, in particular, if a fibre is used for re-injecting the light from the emitter, the fibre used will preferably have a small outlet aperture, such as, for example, a monomode fibre. Thus all the light re-emitted at the outlet of the fibre will be integrally trapped by the reflecting system (plane or concave mirror, or grating) and will be led to the downstream fibre with a maximum yield for the device.

I claim:

1. An optical coupling and extracting device, comprising:
   (a) a first reflective member having a first reflective surface with a first area, said first reflective member having a first center of curvature at a first position in space with respect to said first reflective surface;
   (b) a second reflective member secured with respect to said first reflective member, said second reflective member having a second reflective surface with a second area and a second center of curvature at a second position in space with respect to said first reflective surface, said second position being different from said first position and said second position being on the same side of first reflective member as said first center of curvature;
   (c) an input port positioned at a first point in space said first point being on the same side of said first reflective surface as said first center of curvature;
   (d) an output port positioned at a second point in space, said first and second points being symmetrically positioned with respect to each other about said first center of curvature, said second position in space lying off a line defined between said first and second points;

(e) an injection port positioned at a third point in space, said third point being on the same side of said second reflective surface as said second center of curvature, said second and third points being symmetrically positioned with respect to each other about said second center of curvature; and (f) a sample output port positioned at a fourth point in space, said first and fourth points being symmetrically positioned with respect to each other about said second center or curvature.

2. An optical coupling and extracting device, comprising:

(a) a first reflective member having a first reflective surface with a first area, said first reflective member having a first center of curvature at a first position in space with respect to said first reflective surface;

(b) a second reflective member secured with respect to said first reflective member, said second reflective member having a second reflective surface with a second area and a second center of curvature at a spaced position in space with respect to said first reflective surface; said second position being different from said first position and said second position being on the same side of said reflective member as said first center of curvature;

(c) an input port positioned at a first point in space, said first point being on the same side of said first reflective surface as said first center of curvature;

(d) an intermediate output port positioned at a second point in space, said first and second points being symmetrically positioned with respect to each other about said first center of curvature;

(e) a processed signal input port positioned at a third point in space, said third point being on the same side of said first reflective surface as said first center of curvature.

(f) an output port positioned at a fourth point in space, said third and fourth points being symmetrically positioned with respect to each other about said first center of curvature;

(g) an injection port positioned at a fifth point in space, said fourth and fifth points being symmetrically positioned with respect to each other about said second center of curvature; and (h) a sample output port positioned at a sixth point in space, said first and sixth points being symmetrically positioned with respect to each other about said second center of curvature.

3. An optical device according to claim 2, further comprising an optical processing unit disposed between said intermediate output port and said process signal input port.

4. A device as in claim 3, wherein said optical processing element is a delay line.

5. An optical coupling device as in claims 1 or 2, wherein two of said ports are the ends of fiber optic elements.

6. A device as in claims 1 or 2, wherein said first and second reflective members lie in planes which are at an acute angle with respect to each other.

7. A device as in claims 1 or 2, wherein said first area is larger than said second area.

8. A device as in claims 1 or 2, wherein said first and second reflective members are in planes which are at an acute angle with respect to each other and wherein said first and second centers of curvature are substantially within the same plane.

9. An optical device as in claims 1 or 2 wherein said first and second centers of curvature are in planes which are at an acute angle with respect to each other and said ports are in substantially the same plane as said first and second centers of curvature.

10. An optical device as in claims 1 or 2, wherein said reflective members are concave mirrors.

11. A device as in claim 1 or 2, wherein one of said reflective members is a diffraction grating and the other of said reflective members is a concave mirror.

12. A device as in claim 1 or 2, wherein one of said reflective members is a concave diffraction grating.

13. A device as in claim 1 or 2, wherein said second reflective member occupies a small area disposed in the middle of said first reflective member.

14. A device according to claim 1 or 2 wherein said first and second reflective members have substantially the same vertex.

15. An optical coupling and extracting device, comprising:

(a) a first reflective member having a first reflective surface with a first area, said first reflective member having a first center of curvature at a first position in space with respect to said first reflective surface;

(b) a second reflective member secured with respect to said first reflective member, said second reflective member having a second reflective surface with a second area and a second center of curvature at a second position in space with respect to said first reflective surface, said second position being different from said first position and said second position being on the same side of first reflective member as said first center of curvature;

(c) an input port positioned at a first point in space said first point being on the same side of said first reflective surface as said first center of curvature;

(d) an output port positioned at a second point in space, said first and second points being symmetrically positioned with respect to each other about said first center of curvature;

(e) an injection port positioned at a third point in space, said third point being on the same side of said second reflective surface as said second center of curvature, said second and third points being symmetrically positioned with respect to each other about said second center of curvature; and (f) a sample output port positioned at a fourth point in space, said first and fourth points being symmetrically positioned with respect to each other about said second center of curvature, said fourth point being unsymmetrical with respect to said third point about said second center of curvature.

* * * * *